United States Patent
Brenders et al.

(10) Patent No.: US 9,983,324 B2
(45) Date of Patent: *May 29, 2018

(54) SEISMIC ACQUISITION METHOD AND APPARATUS

(71) Applicant: BP Corporation North America Inc., Houston, TX (US)

(72) Inventors: Andrew James Brenders, Houston, TX (US); Joseph Anthony Dellinger, Houston, TX (US); Graham Openshaw, Portsmouth, NH (US)

(73) Assignee: BP Corporation North America Inc., Houston, TX (US)

( * ) Notice: Subject to any disclaimer, the term of this patent is extended or adjusted under 35 U.S.C. 154(b) by 75 days.

This patent is subject to a terminal disclaimer.

(21) Appl. No.: 14/957,363

(22) Filed: Dec. 2, 2015

(65) Prior Publication Data

US 2016/0187517 A1    Jun. 30, 2016

Related U.S. Application Data

(60) Provisional application No. 62/086,581, filed on Dec. 2, 2014.

(51) Int. Cl.
*G01V 1/38* (2006.01)
*G01V 1/00* (2006.01)

(52) U.S. Cl.
CPC ............ *G01V 1/3808* (2013.01); *G01V 1/005* (2013.01); *G01V 1/3852* (2013.01); *G01V 1/3843* (2013.01)

(58) Field of Classification Search
CPC .... G01V 1/3808; G01V 1/005; G01V 1/3852; G01V 1/3843

USPC .............................................. 367/15, 23, 49
See application file for complete search history.

(56) References Cited

U.S. PATENT DOCUMENTS

| | | |
|---|---|---|
| 4,319,347 A | 3/1982 | Savit |
| 4,758,998 A | 7/1988 | Johnson et al. |
| 5,430,689 A | 7/1995 | Rigsby et al. |
| 7,257,049 B1 | 8/2007 | Laws et al. |
| 7,725,266 B2 | 5/2010 | Sirgue et al. |
| 2003/0218937 A1 | 11/2003 | Berg et al. |
| 2007/0195644 A1 | 8/2007 | Marples et al. |
| 2009/0147621 A1 | 6/2009 | Hegna |
| 2010/0002539 A1 | 1/2010 | Kragh et al. |
| 2010/0232260 A1 | 9/2010 | Zowarka et al. |
| 2012/0075955 A1 | 3/2012 | Dean |

(Continued)

FOREIGN PATENT DOCUMENTS

| | | |
|---|---|---|
| CN | 103323876 A | 9/2013 |
| WO | 2010/149589 A2 | 12/2010 |
| WO | 2013/138956 A1 | 9/2013 |

OTHER PUBLICATIONS

PCT International Search Report dated Mar. 9, 2016.

(Continued)

*Primary Examiner* — Daniel L Murphy
(74) *Attorney, Agent, or Firm* — K. KaRan Reed (57) ABSTRACT

A technique for use in geophysical surveying includes imparting a plurality of humming seismic signals and a plurality of swept seismic signals into a geological formation. The technique also includes receiving returned seismic energy of the plurality of humming seismic signals and the plurality of swept seismic signals after interacting with the geological formation and recording the returned seismic energy.

15 Claims, 3 Drawing Sheets

(56) References Cited

U.S. PATENT DOCUMENTS

| | | |
|---|---|---|
| 2012/0147699 A1 | 6/2012 | Dellinger et al. |
| 2012/0155217 A1* | 6/2012 | Dellinger ............... G01V 1/005 367/38 |
| 2012/0314536 A1 | 12/2012 | Bagaini |
| 2013/0013212 A1 | 1/2013 | Hatchell et al. |
| 2013/0170317 A1 | 7/2013 | Stork |
| 2013/0250733 A1 | 9/2013 | Phillips et al. |
| 2013/0333974 A1 | 12/2013 | Coste et al. |
| 2014/0081576 A1 | 3/2014 | Grenie et al. |
| 2014/0336939 A1 | 11/2014 | Brune |
| 2015/0120200 A1 | 4/2015 | Brenders et al. |

OTHER PUBLICATIONS

PCT/2015/063200 International Search Report dated Mar. 7, 2016 (6 p.).
PCT/2015/063492 International Search Report dated Mar. 14, 2016 (6 p.).
PCT/2015/063207 International Search Report dated Mar. 2, 2016 (5 p.).
PCT/2015/063219 International Search Report dated Apr. 4, 2016 (5 p.).

* cited by examiner

SEISMIC ACQUISITION METHOD AND APPARATUS

CROSS-REFERENCE TO RELATED APPLICATIONS

This application claims benefit of U.S. provisional patent application Ser. No. 62/086,581 filed Dec. 2, 2014, and entitled "Seismic Acquisition at Low Frequencies with Deeply Towed, Heavy Seismic Sources," which is hereby incorporated herein by reference in its entirety.

STATEMENT REGARDING FEDERALLY SPONSORED RESEARCH OR DEVELOPMENT

Not applicable.

BACKGROUND

The technique disclosed herein pertains to seismic surveying and, more particularly, to marine surveying at low frequencies.

The pursuit of hydrocarbons and some other fluids is sometimes greatly hampered by their being located in deposits underground in certain types of geological formations. Such deposits must be identified and located by indirect, rather than direct, observation. This includes imparting acoustic, or sound, waves of selected, seismic frequencies into a natural environment so that they may enter the earth and travel through the subterranean geological formations of interest. During their travels through the formations, certain features of the formations will return waves back to the surface where they are recorded. The seismic data thus recorded contains information regarding the subsurface geological formations from which one can ascertain things like the presence and location of hydrocarbon deposits. That is, seismic data are representative of the geological formations from which they are obtained.

For example, one tool frequently used in the analysis of the seismic data is what is known as a "velocity model". A velocity model is a representation of the geological formation that can be used in analysis. It may be used to, among other things, convert the seismic data into one or more "seismic domains" that image the geological formation in different ways. The quality of these images frequently depends upon the quality of the velocity model. It may also be used in other ways to, for another example, analyze various geophysical characteristics of the formation. Other types of models of the underlying geological formations, collectively called "subsurface attribute models" herein, are also used and implicate similar considerations in the present context.

Over time, the need to locate hydrocarbon deposits more accurately and more precisely has grown. Sometimes advances in accuracy and precision come in the form of new acquisition techniques. Other times such advances are achieved through the manner in which the seismic data are processed such as those described in the above. Sometimes advances result from a combination of developments in both acquisition and processing.

A relatively recent development in seismic acquisition is "low-frequency" acquisition. Seismic surveying historically has used frequencies in the range of 8-80 Hz for seismic signals because of their suitability in light of technical challenges inherent in seismic surveying. The term "low frequencies" is understood within this historical context as frequencies below which getting sufficient signal to noise with conventional sources rapidly becomes more difficult as the frequency decreases, i.e. below about 6-8 Hz.

The use of low frequencies for imaging marine seismic data has proven challenging for frequencies below about 6 Hz, particularly for frequencies below about 4 Hz. The challenge is twofold: (1) at lower frequencies, the naturally occurring seismic background noise of the Earth gets progressively stronger and (2) conventional broadband sources such as airguns get progressively weaker. As a result, the signal-to-noise of deepwater marine seismic data can decline at over 30 dB per octave for frequencies below 4 Hz.

Thus, while there may be many suitable techniques for seismic imaging in general and for generating subsurface attribute models in particular, the need for increased effective signal-to-noise ratios, at low frequencies, continues to drive innovation in the art. In particular, among other things, there is a need for acquisition and processing techniques that enhance acquisition and use low-frequency seismic data at lower frequencies. The art is therefore receptive to improvements or at least alternative means, methods and configurations that might further the efforts at improvement. As a result, the art will welcome the technique described herein.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

The presently disclosed technique acquires seismic data at low seismic frequencies to generate better starting models for subsurface attributes, rather than for enhancing the bandwidth of airguns for broadband imaging as in conventional practice. Such models need not be perfect, but only adequate as a starting model for an iterative refinement in this approach, using model-updating techniques such as Full-Waveform Inversion ("FWI"). Furthermore, it would be useful to update subsurface attribute models to relatively deep depths.

This raises the question of what low frequencies are desirable. One area of interest in seismic surveying is salt formations. For a salt 3 km thick with a velocity of 4600 m/s, a half wavelength at zero offset fitting inside the salt would implicate a frequency of $(4600/2)/3000=0.77$ Hz. By going to wider offsets, the frequency does not have to get this low to get the same vertical wavenumber. Nevertheless, the involved frequencies are below what those in the art expect to be able to produce using airguns, even very large ones. Notably, conventional seismic imaging mostly uses streamers, not nodes. Unfortunately, streamers generate considerable noise at frequencies below about 4 Hz, which are of most interest, compounding the signal-to-noise ratio problem at low frequencies.

With respect to updating subsurface attribute models to relatively deep depths, the rule of thumb is that the depth of penetration of diving waves (and thus FWI updates) is generally about ⅓ of the maximum offset. So, for example, to improve a subsurface attribute model to a depth of 10 km, the survey should therefore employ offsets out to at least 30 km. That is, for most sources, there should be receivers at a range of offsets out to 30 km away from the source.

These factors impact other aspects of the survey design. The frequencies under discussion are low, such that even by the conservative Nyquist sampling criterion, a principle of sampling theory well known to those in the art, the survey does not need sources and receivers at the sample intervals typical for conventional acquisition. The Nyquist sampling criterion applied to source and receiver spacing is "2 points per wavelength along the recording surface". Typical shot densities in conventional acquisition are 50 meters apart or less, which at a water velocity of 1500 m/s is well sampled by the Nyquist criterion for frequencies of (1500 m/s/50 m)/2=15 Hz or less. For waves of 2 Hz the Nyquist criterion would require a source or receiver only every (1500 m/s/2 Hz)/2=375 meters. A typical ocean-bottom-node density in conventional acquisition of 430 meters becomes well sampled by the Nyquist criterion at frequencies of 1.74 Hz or less. Thus, whether the shot or receiver density is well sampled depends on the frequency under consideration.

Effective FWI can be obtained with either the source or the receiver side well sampled, rather than both. So, where the source side is well sampled the receivers can be much coarser than the ~400 meters suggested by the Nyquist criterion, i.e. 2 km apart or more.

Alternatively, the low-frequency acquisition may make use of an ocean-bottom node grid laid out for acquisition at conventional frequencies, a so-called "piggyback" survey. Then a typical ocean-bottom node spacing of about 400 meters, a coarse (i.e., not sampled within the Nyquist criterion) grid at conventional frequencies, may be sufficient to ensure the receivers are well sampled by the Nyquist criterion for sufficiently low frequencies. With the receiver side well sampled, the low-frequency shot lines may then be spaced much coarser than this, i.e. 2 km apart or more.

Note it is often computationally more efficient to have the receivers more finely sampled than the sources when performing computations. The principle of seismic reciprocity can be used to reverse the roles of sources and receivers for the purposes of the computation to make this so, as is well known to those of ordinary skill in the art. Thus either the physical sources or receivers may sample the computational "receiver" wavefield.

In practice FWI can often produce usable results even if the Nyquist sampling criterion is not met by either the source or receiver acquisition. FWI works by back-propagating a residual wavefield (the difference between the wavefield predicted at the receivers and what was actually measured there). Thus, for the purposes of updating the velocity model, it is the sampling of the residual wavefield, not the receiver wavefield, that matters. If the velocity model used to create the predicted wavefield is a good approximation of the true velocity model, the rate of change of the phase of the predicted and measured receiver wavefields will be similar. The phase difference between these (i.e. the phase of the residual wavefield) will then accumulate with distance rather slowly. The wavelength of the residual wavefield may thus be considerably larger than the wavelength of the receiver wavefield, allowing a correspondingly larger receiver spacing to suffice for representing the residual wavefield.

How far the sampling can be pushed beyond the Nyquist criterion depends on the (unknown) accuracy of the velocity model. In practice, the choice of source and receiver spacing is a balance between how much faith we are willing to place in our velocity models and cost. For both shots and receivers, finer inline sampling is typically much less expensive to obtain than finer crossline sampling, and hence the limiting factor is most often the crossline spacing of either the sources or receivers.

In the present context, "inline" and "crossline" are well defined for a shot line. Inline is the direction the boat traveled. Crossline is orthogonal to the inline direction. In the case of an ocean bottom receiver array, with similar spacing in Cartesian coordinate X and Y orthogonal directions, "inline" and "crossline" will be determined relative to the shot lines of the survey. However, in the case where the ocean bottom receiver array spacing is not the same, "inline" is the denser axis and "crossline" is the coarser axis. Typically, in that case, the inline direction would be the direction the ROV moved when it deployed the nodes. Economic considerations will generally dictate that the crossline spacing will be greater than or equal to the inline spacing.

Another well-known design consideration in a marine seismic survey is the far-field effect of the sea-surface reflection, in particular the "ghost notch" at 0 Hz. In the approach disclosed herein, the survey tows the sources and, in some embodiments the receivers, as deep as is feasible to mitigate the deleterious effects of the ghost notch. In addition, the sources are heavy, and so are towed at a steep tow angle in the embodiments illustrated herein.

Thus, this particular approach embodies a number of unique design principles such as deeper, heavier tow, minimized low-frequency noise, very wide source-receiver offsets, and sparse acquisition (as compared to conventional practice) in varying permutations depending upon the embodiment. The presently disclosed technique therefore employs a wide-offset, ocean-bottom-node geometry as disclosed more fully below to accommodate these concerns.

The deeper tow principle also implies towing the seismic source(s) deeper than is typical for airguns as well. In one particular embodiment of the disclosed technique, the seismic source is heavy enough to hang nearly vertically underneath the source vessel. This is referred to, for present purposes, as a "heavy tow".

The heavy tow is distinguishable from conventional practice by the weight on the towline. In conventional practice, the tow body (e.g., the seismic source) is approximately neutrally buoyant in water and its weight is not significantly supported by the towline. In fact, depressor weights are quite often used to decouple the tow body entirely from the vertical component of the tow. In a heavy tow, the tow body is not neutrally buoyant and the towline carries a significant weight. In some embodiments, the towline may carry up to several tons. Within the context of this disclosure, a heavy tow is one in which the seismic source is heavy enough be towed at a steep tow angle as discussed further below.

Heavy tow has some advantages. One benefit of the heavy tow is that the seismic source need not be towed behind the source vessel, but could instead be towed from the side of the source vessel. The middle of the vessel moves less than the stern in rough seas, keeping the seismic source at a more stable tow depth. Towing the seismic source from the side of the source vessel would thus have the advantage of minimizing the heave on the seismic source tow line. This is useful because depth changes may alter the resonant frequency of the seismic source or produce large tensions on the tow line. In this particular embodiment, the depth of tow is determined by the performance of the device as a function of depth balanced against the advantages of a deeper tow in minimizing the deleterious effects of the ghost notch at 0 Hz. In alternative embodiments, the depth of tow may be limited by the water depth, the weight and strength of the tow cable, or other considerations.

The heavy tow described above also relaxes vessel speed considerations in that vessel speed need not be maintained to keep a stable tow line trailing behind the source vessel. Instead, the source vessel only needs to go fast enough to keep the source vessel itself under good control and, in some embodiments, the seismic source stably oriented. The vessel speed may therefore be controlled by how long it takes for the seismic source to generate sufficient energy in the desired frequency range over one "shot point"; the width of the shot point being determined by the Nyquist criterion for the highest frequency of interest. If more energy per shot point is desired, it may be obtained simply by towing the seismic source more slowly. If the source vessel is capable of maintaining a fixed location, and stability of the seismic source is not an issue, it can even pause and emit energy for as long as necessary at each shot location.

Heavy tow also has some disadvantages. As is known to those of skill in the art, tow lines may be susceptible to vortex-induced vibration ("VIV"), and the taut, steep tow line supporting the weight of the device may be especially susceptible to VIV. Some sort of VIV suppression may be required to keep the tow line(s) from strumming due to their motion through the water. It may be necessary to have alternative shot line orientations planned to avoid aggravating the VIV due to sailing against a strong current.

Under heavy tow, some sort of system, such as a heave compensator, may be employed to prevent vertical motions of the ship from being transmitted to the device. VIV suppression typically involves surrounding the tow line with, for example, fluffy material or aerodynamically shaped cladding. It may be impractical to design or procure a heave compensator that accepts a weight-supporting tow line equipped with VIV suppression. The heave compensation may need to be "indirect", with a line that will fit through the heave compensator controlling the motion of another line fitted with VIV suppression that is attached to the device.

In light of the considerations set forth above, the presently disclosed technique uses, in various embodiments, widely spaced ocean-bottom nodes (~2 km apart) placed out to very wide source-receiver offsets (≥15 km, and up to at least ~30 km), shot lines much more widely separated (~400 meters apart) than for conventional acquisition (but well sampled for sufficiently low frequencies), a survey vessel of the kind that might tow a remotely operated vehicle ("ROV") rather than a typical streamer vessel, and a deep seismic source (depths of 30m or more) towed from the side of the source vessel. The source vessel includes some sort of heave compensation to keep the depth steady and reduce stress on the tow line, and some sort of VIV suppression to keep the taut tow line from strumming in some embodiments.

Furthermore, FWI typically only requires pressure data, recorded by hydrophones. If a survey design only needs hydrophone recordings, receivers used in nodes could be deployed from a basket moved along tens of meters above the sea floor. The nodes are dropped from the basket and fall the short distance to the sea floor. These nodes might be retrieved by having a buoyant streamer above them in the water that could be snagged with a similar "fly-by" technique.

Note that not all embodiments will possess all of these characteristics. For example, even though ocean nodes may be coarsely spaced (2 km or more in the receiver crossline direction), some embodiments (for example "piggyback" surveys) may choose to space them at conventional distances (450 m or less in both the inline and crossline directions). In this case because the receivers are well sampled (at sufficiently low frequencies), the shot lines do not need to be well sampled, even for low frequencies, and so may be even more coarsely spaced (2 km or more).

Similarly, some embodiments may choose to simultaneously deploy low-frequency sources and conventional sources, and thus may use a conventional spacing for low-frequency shot lines (50 m or less) rather than widely spaced shot lines (~400 m or more) as in other embodiments. The shot and receiver lines may be oriented orthogonally to each other, each coarsely spaced in its crossline direction, but well sampled (less than about 400 m) in its inline direction. Additional information regarding this particular design may be found in the U.S. patent application having priority to U.S. Provisional Application No. 62/086,362, entitled, "Box Wave Arrays in Marine Seismic Surveys", filed on an even date herewith in the name of the inventors Andrew J. Brenders, et al., and commonly assigned herewith. Those in the art having the benefit of this disclosure will appreciate still other permutations that may be implemented in alternative embodiments.

Reference will now be made in detail to the present embodiment(s) (exemplary embodiments) of the invention, an example(s) of which is (are) illustrated in the accompanying drawings. Wherever possible, the same reference numbers will be used throughout the drawings to refer to the same or like parts.

Figure 1:
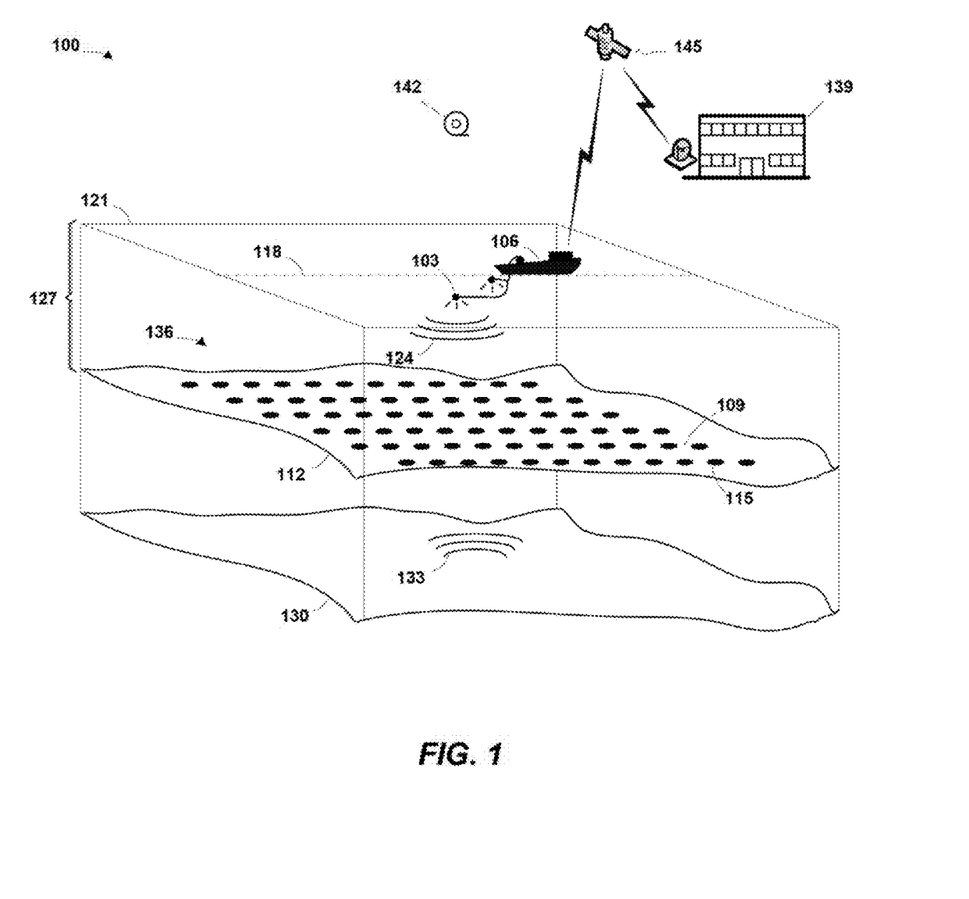
FIG. 1 conceptually illustrates a marine seismic survey conducted in accordance with one particular embodiment of the presently disclosed technique.

FIG. 1 conceptually illustrates a marine seismic survey acquisition 100 conducted in accordance with one particular embodiment of the presently disclosed technique. The marine seismic survey 100 is conducted using at least one low frequency seismic source 103 towed by a source vessel 106. It also includes a plurality of receiver lines 109 disposed upon the seabed 112. In this context, "low frequency" means <4 Hz. Each receiver line 109 includes several nodes 115, which, in the illustrated embodiment, are hydrophones; although in alternative embodiments they may be geophones or multicomponent receivers. In other embodiments, "low frequency" means <6 Hz.

Figure 2:
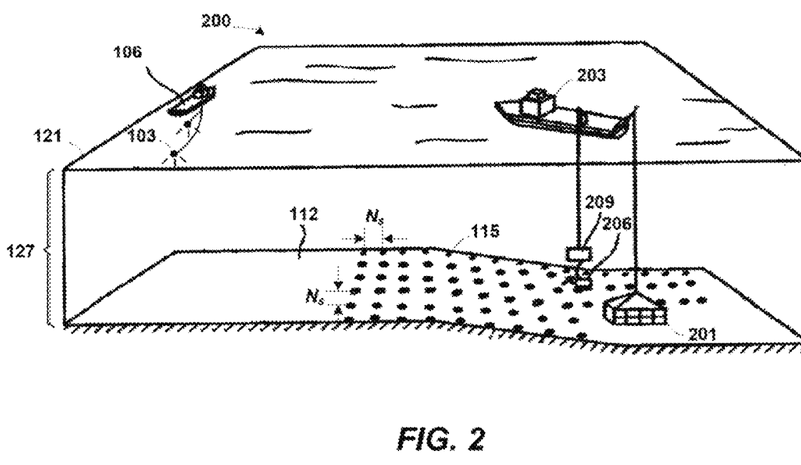
FIG. 2 conceptually depicts the deployment of the nodes for alternative embodiments of the marine seismic survey of FIG. 1.

This one, particular embodiment uses a deployment 200 illustrated in FIG. 2 for the nodes 115. This particular embodiment is disclosed more thoroughly in U.S. Pat. No. 6,975,560, modified as described herein. The nodes 115 are disposed from a carrier 201 suspended from a survey vessel 203 using an ROV 206 at the end of a tether management system 209. Similarly, the nodes 115 are also retrieved to the carrier 201 using the ROV 206 and then to the survey vessel 203. Additional information on how this operation is conducted may be found in U.S. Pat. No. 6,975,560.

Figure 3:
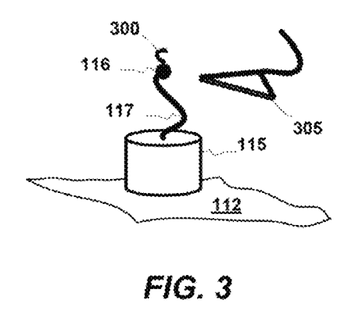
FIG. 3 depicts a retrieval technique as may be used in some embodiments.

The nodes 115 may be retrieved in this particular embodiment as is shown in FIG. 3. Each node 115 rests upon the seabed 112 as described above. A buoyant element—e.g., a buoyant, tethered buoy 116—extends from one end and floats above the node 115. The tether 117 may itself be buoyant or may rely upon the buoyancy of the buoy 116. The buoy 116 includes a hook 300 or other similar structure extending from the end opposite the attachment of the tether 117. Note that the size, weight, and placement of the hook 300 should be such that it remains oriented upright as shown in FIG. 3 rather than rotating downward.

Because the buoy 116 floats above the seabed 112 and the node 115, it is amenable to retrieval using a towed grappling device 305 in a "fly by" of the receiver line 109. The grappling device 305 may be towed by, for example, the remotely operated vehicle ("ROV") 206 or a surface vessel. Once grappled, the ROV 206 can then be used to place the nodes 115 back into the carrier 201. Once the carrier 201 is full, or all the nodes 115 are retrieved, the carrier 201 can then be lifted to the surface vessel 203. Alternatively, the grappled nodes 115 may be retrieved directly to the surface.

Many variations of this "fly-by" technique are possible. In alternative embodiments the buoy 116 might be above the hook 300, or the hook 300 could be replaced by a block of ferrous metal and the grappling device 305 by an electromagnet, etc.

The presently disclosed technique admits further variation in the deployment and retrieval of the nodes 115. For example, a type of surveying known as electromagnetic, or "EM", surveying conventionally uses what are known as "pop-up" nodes. Such nodes are deployed from over the side of a source vessel and permitted to free fall to the seabed, where their resting positions may be determined by acoustic ranging methods well known in the art. When the seismic survey is completed, a signal is sent to the nodes from the surface ordering them to release their anchors and float back to the surface—or, "pop up". The anchor may be made from a substance that harmlessly dissolves in sea water over a period of months, and in some cases, up to a few years. Some embodiments may forego the signal release in favor of a timed release. Some embodiments may replace the anchor with a swim bladder, for example, by replacing water in a chamber with gas to cause the node to pop up.

In another embodiment particularly suited to deployments in shallow water, the nodes may be attached or built into an ocean-bottom cable that is spooled out from a moving ship and allowed to sink to the sea floor. The ocean-bottom cable is then later snagged at one end, the end lifted, and the cable spooled back onto the ship in reverse fashion to how it was deployed. These and other such variations are all within the scope of the claims set forth below. It should be noted that such methods are particularly suited to deployment and retrieval of hydrophones, since these do not need to be either carefully coupled to the seafloor or precisely oriented.

The embodiment of FIG. 2 envisions shots that are sufficiently densely spaced in both the inline and crossline directions (~400 m or less) that the receivers do not need to be spaced according to the Nyquist criterion. The embodiment of FIG. 2 therefore uses coarsely spaced ocean-bottom nodes 115. In this context, "coarsely spaced" means a node spacing $N_s$ of greater than or equal to ~750 m, or about double the Nyquist criterion at 2 Hz. Some embodiments may employ a node spacing $N_s$ greater than or equal to ~1 km, or ~2 km, or ~4 km. Some embodiments may employ a node spacing that is approximately equal along both axes, such as is shown in FIG. 2.

Alternative embodiments may achieve a greater efficiency in deploying and retrieving the nodes by using a node grid in which the nodes are spaced apart more coarsely along one axis than the other, for example an inline node spacing of ~400 m but a crossline spacing of ~800 m, or ~1 km, or ~2 km, or ~10 km. Crossline node spacing greater than about 2 km would not be practical for conventional imaging purposes, but can be practical for the purposes of the invention because the goal is not detailed imaging of reflectors, but merely "improved starting velocity models".

Note in particular that if the nodes are deployed from an ROV, there may be little advantage in using an inline node spacing of much greater than about 400m, because for wider spacing the time the ROV spends laying down the node is no longer the dominant factor determining cost; instead it becomes the time it takes the ROV to transit from one node location to the next. Similarly, conventional ocean-bottom cables have a node spacing of about 50m, and thus the inline spacing for these is fixed. The acquisition cost is determined by how many cables are required, which is determined by the crossline node spacing, which will be chosen to be as coarse as possible given the geophysical objectives, and typically will be much larger than 50 m. However, for other embodiments such as autonomous nodes, which swim to a pre-set position and plant themselves, the determining cost may be the total number of nodes and not their spacing, in which case there may be little reason to choose to use a wider spacing along one node axis than the other.

Returning now to FIG. 1, as noted above, the source vessel 106 tows at least one low frequency seismic source 103. In some embodiments, the low frequency seismic source 103 may be towed from the stern of the source vessel 106 in conventional fashion. However, in the illustrated embodiment, the low frequency source(s) 103 is/are towed from the side of the source vessel 106 as is shown in FIG. 1.

In the illustrated embodiment, sources 103 are low-frequency humming and/or narrowband sweeping sources. A "humming" source radiates the bulk of its energy at a single monochromatic frequency, or a small number of monochromatic frequencies. A "narrowband sweeping source" sweeps, but unlike a conventional broadband sweeping source only over a narrow frequency range of less than two octaves. Each of the sources 103 will contain a receiver or sensor (not shown) that will record the wavefield emitted by that source. In one particular embodiment, the humming or narrowband source is implemented using the source disclosed and claimed in U.S. Pat. No. 8,387,744. The signal produced by this source is not only a low frequency signal, but also a narrowband signal. However, the technique is not limited to acquisition with this particular source. Alternative embodiments may utilize other types of low frequency sources.

In an alternative embodiment, the humming or narrowband source is implemented using an embodiment of the source disclosed and claimed in U.S. application Ser. No. 14/515,223, entitled, "System and Method for Resonator Frequency Control by Active Feedback", filed on Oct. 15, 2014, in the name of the inventors Mark Francis Lucien Harper; Joseph Anthony Dellinger. In this embodiment, the source contains a low-friction reciprocating radiating piston moving with a resonant frequency controlled by a two-sided variable gas spring. In one embodiment, the radiating piston is sealed against the external fluid pressure using the external fluid (typically sea water) to pressurize a hydrostatic seal. The frequency of oscillation of the radiating piston is determined by the balance between the external and the internal fluid pressures. The internal fluid pressure is provided by a pair of gas springs. The stiffness of the first gas spring is controlled by two squeeze pistons, not one, acting on a gas spring piston that is coupled to the radiating piston. This controllable gas spring operates in parallel with a second fixed (i.e. non-controllable) gas spring comprising the body of the device.

The pair of squeeze pistons bounding the controllable gas spring provides two degrees of freedom that can be used when operating the device. Only one degree of freedom is required to control the resonant frequency of the source. The other degree of freedom may then be used to control the center of oscillation of the gas spring piston, and thus the buoyancy of the source. Control of the buoyancy of the source allows it to be towed at a more stable depth. In some embodiments, a feedback process analogous to the one that uses the squeeze pistons to control the resonant frequency may be employed to use the squeeze pistons to simultaneously also control the buoyancy, so as to achieve a desired stable tow depth.

In an embodiment, the extra degree of freedom may be incorporated into sweep profile design, i.e. the nominal design trajectories of the two squeeze pistons bounding the controllable gas spring. The design trajectories specify how the squeeze pistons should move with time over the course of a sweep. One strategy, as stated above, is to design the trajectories to maintain a constant buoyancy over the sweep. This strategy can also be used to keep the oscillation of the gas spring piston centered within its available travel window, allowing it to achieve maximal amplitude in its oscillations while still maintaining a minimum desired safety margin from both travel limit endpoints.

However, in alternative embodiments where constant buoyancy is less of a concern, the extra degree of freedom could instead be used to modify the acoustic properties of the sweep, for example to minimize or maximize radiated harmonics of the fundamental tone. This requires using the extra degree of freedom to adjust the properties of the controllable gas spring so as to make the joint effect of all the springs operating in parallel, which together control the resonant motion of the piston, either more or less linear, respectively. The precise details of how to accomplish this will depend on the design of the particular device being used.

Other strategies are also possible for keeping the oscillation of the gas spring piston within its available travel window, and these may be used individually or in combination with other strategies. The measured motion of the piston can be used in a feedback loop to correct the tow depth in real time. In an exemplary embodiment, if the piston is in danger of encountering the outer limit of its travel, the tow depth would be increased, applying more external pressure and moving the piston back in. If the piston were in danger of encountering the inner limit of its travel, the tow depth would similarly be decreased, moving the piston outward.

Instead of a single profile, a suite of profiles may be provided at various amplitudes, to provide a "volume control" for the device. In an embodiment where the limits of motion of the piston are not being sufficiently accurately maintained (for example because of rough seas, problems with the towing equipment, or inexperienced operators) a less demanding lower-amplitude profile that provides more clearance at both ends of the piston's travel may be used instead. The tow speed could then be adjusted along with the profile amplitude to maintain a constant signal-to-noise per "shot point". In an exemplary embodiment, a lower-amplitude profile could be compensated for by allowing more time per "shot point", which requires using a profile that extends for longer in time, which in turn requires a slower tow speed for that longer profile to fit into one "shot point" as determined by the Nyquist criterion.

The low-frequency sources 103 are shown towed at deeper depths; in some embodiments multiple low frequency sources will be towed, each at a depth appropriate for its frequency range. Thus, the deeper the depth of tow, the lower the frequency of the humming or narrowband swept source. See, for example, U.S. application Ser. No. 12/291,221 or U.S. Pat. No. 7,257,049, which discuss the relationship between depth and frequency of acquisition. For some types of sources, the available frequency range shifts upwards with increasing depth, for example because an increase in water pressure raises the resonant frequency of the source. Thus, in other embodiments the lower-frequency sources will be towed at shallower depths, despite the greater attenuation from the surface ghost reflection that this will cause.

Many variations of this acquisition are possible and well within the ordinary skill in the art to devise with the benefit of this disclosure. The instant survey system shown in FIG. 1 could acquire 2D, 3D, or 4D data. Other recording systems could be used alongside or instead of ocean-bottom cables or nodes, including "nodes on ropes", receivers situated in a borehole, receivers dangling from wave gliders, receivers floating in the water column, vertical cables, or low-noise deep-tow streamers. In an embodiment, nodes on ropes are ocean-bottom nodes that are self-powered independent recording units which are strung on cables that are used to deploy them. Variations in the design of the spread or the number of vessels will also be readily appreciated by those skilled in the art having the benefit of this disclosure.

The low-frequency narrowband survey could be performed at the same time as a conventional, higher-frequency broadband survey, or in a separate pass, or in multiple separate passes. Or, a low-frequency narrowband survey could be acquired first, and a conventional higher-frequency broadband survey later. Or, a low-frequency narrowband survey could be used to supplement a previously acquired conventional higher-frequency broadband survey such that the original data are re-processed with the additional low-frequency data.

In one embodiment, the low-frequency data could be used to augment the bandwidth of the conventional higher-frequency data, thereby producing an image with enhanced bandwidth. The augmented data may be re-imaged using the same velocity model as before.

In another embodiment, the low-frequency narrowband survey could be acquired in an area that has proven difficult to image using existing conventional higher-frequency data. The low-frequency narrowband data could then be used with FWI to create an improved velocity model, which could then be refined using data from an existing conventional higher-frequency broadband survey. Then, the refined velocity model could be used to re-image seismic data from an existing conventional higher-frequency broadband survey, producing an improved image.

These two embodiments may also be used in combination, so the low-frequency narrowband survey could first be used to improve the velocity model, and then to enhance the bandwidth of the data re-imaged using the improved velocity model.

The low-frequency sources 103 could operate continuously. The low-frequency sources 103 could each operate at a single frequency or cycle between two or more discrete frequencies ("humming" low-frequency sources), or sweep over a narrowband range of low frequencies designed to augment the frequency range produced by the broadband sources ("narrowband sweeping" low-frequency sources). The sources could operate to produce waves of constant amplitude, or the amplitude of the waves could vary (taper up and down).

In the illustrated embodiment, two low frequency sources 103 hum at 1.4 and 2.72 Hz, respectively. In other embodiments, a single source simultaneously humming at a fundamental and a second harmonic, 1.4 and 2.8 Hz, might be used, or a single source might alternate back and forth between 1.4 and 2.72 Hz. Other embodiments might realize such variation using alternative frequencies within the ranges described herein.

Turning now to narrowband sweeping acquisition, there is no attempt to sweep over a sufficient bandwidth to make an interpretable seismic image from the resulting data alone. The data are instead processed to provide a sufficient signal-to-noise ratio for full-waveform inversion. So, for example, we might sweep over 2-8 Hz, two octaves. The minimum acceptable bandwidth for an interpretable image is about 3 octaves.

It may further be desirable to choose to perturb the frequencies of the humming sources to prevent unwanted interference of harmonics between the seismic sources. For example, if the theory suggests that sources emitting waves 1.0 and 2.0 Hz should be employed, it might be preferred instead to use 0.9 and 2.1 Hz, to avoid having one source frequency conflict with the second harmonic of the other. Optionally, the harmonic or subharmonic output of a humming or narrowband source might be enhanced and use made of the harmonics or subharmonics as additional humming sources. So, for example, one source might simultaneously generate waves having frequencies of 1.4 and 2.8 Hz.

In some embodiments, recording systems suffer from "tinnitus", noise generated within the recording electronics, typically at a small number of discrete frequencies. Due care should be taken to determine whether the recording system to be used suffers from tinnitus before deployment, and to measure its properties. Some equipment used in the field may also generate strong energy at particular discrete frequencies. The properties of the ambient noise in an area to be surveyed ideally should be measured before the surveying begins, to determine what frequencies might be locally compromised by man-made noise. As part of the survey design, the frequencies of the humming sources should be chosen to avoid any frequencies that are strongly polluted by narrowband noise, either from the environment or the recording equipment.

Multiple narrowband low-frequency sources 103, where used, may operate independently or simultaneously. The narrowband low frequency sources 103 may operate continuously or intermittently. Each narrowband low-frequency source 103 records the signal it is radiating, as this information will be used when processing the acquired data. The receivers could be recorded continuously. The locations of all sources and receivers will, in some embodiments, also be recorded continuously.

The source vessel 106 tows the low frequency sources 103 along "shot lines" 118 (only one shown) during the acquisition. In the illustrated embodiment, the shot line spacing $S_s$ is relatively coarse compared to conventional acquisition practices. In this context, "relatively coarse" in this particular embodiment means up to ~400 meters, which is coarser than conventional acquisition but close to the Nyquist criterion for frequencies around 2 Hz or below. The shot lines are also placed out to very wide source-receiver offsets relative to conventional practice. Again, in this context, relatively wide source-receiver offsets are those up to ~30 km. Alternative embodiments may use relatively coarse shot lines without wide source-receiver offsets or conventionally spaced shot lines with very wide source-receiver offsets.

As used herein, the term "coarse" is used to mean the opposite of "dense". The term "dense" means sampled within the well-known Nyquist criterion. Thus, the term "coarse" means sampled using spacing that does not meet the Nyquist criterion.

In some embodiments the receivers may be more closely spaced along an "inline" direction than they are along a "crossline" direction, and the shot lines are oriented parallel to the receiver crossline direction. That is, the shot inline direction is the receiver crossline direction, and the shot crossline direction is the receiver inline direction. Additional information regarding this particular design may be found in the U.S. patent application having priority to U.S. Provisional Application No. 62/086,362, entitled, "Box Wave Arrays in Marine Seismic Surveys", filed on an even date herewith in the name of the inventors Andrew J. Brenders, et al., and commonly assigned herewith.

The low frequency seismic sources 103 are also towed at a deep depth and, as a result of the heavy tow, at a steep tow angle. In the illustrated embodiment, the "deep depth" is ≥30 m, but this may vary in alternative embodiments from, for example, ~3m to ~60m, or in some embodiments up to ~100m. The tow angle is, for present purposes, the deviation of the tow line from the vertical normal to the mean ocean surface 121. In the illustrated embodiment, the steep tow angle is ~10° off the vertical, but this may differ among embodiments.

The heavy tow, if at a tow angle sufficiently close to the vertical, may generate a vortex induced vibration ("VIV"), a phenomenon known to the art. There are known VIV suppression techniques, but these can be overwhelmed if the VIV becomes severe enough. Thus, the precise measure of the steep tow angle will vary amongst embodiments depending upon, for example, the angle of the tow, the severity of the VIV, and the number and effectiveness of VIV suppression techniques (if any) that are employed. Those in the art having the benefit of this disclosure may discern and appreciate other factors, as well. Thus, a "steep" tow angle is one that is close enough to vertical that VIV starts to become a problem. Note that the use of VIV suppression techniques may impact the measure of the steep tow angle.

Figure 4:
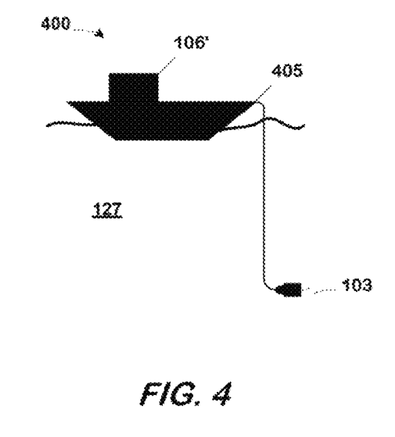
FIG. 4 depicts an alternative embodiment in which the seismic source is towed from the stern rather than the side of the source vessel.
Figure 5:
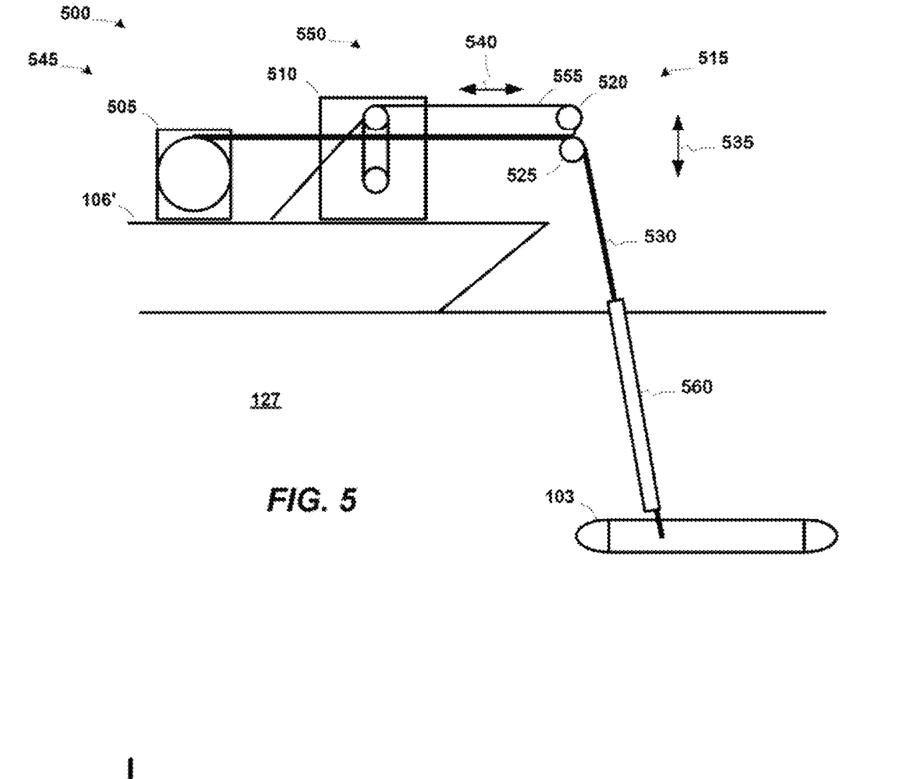
FIG. 5 illustrates a method for towing incorporating a vortex-induced-vibration suppression system as is used in the embodiment of FIG. 4.

As mentioned above, the source vessel 106 may employ a VIV suppression technique. There are several such techniques known to the art and any suitable technique may be employed. However, one such, non-conventional technique is employed by the embodiment of FIG. 4 and is shown in FIG. 5. Note that the embodiment 400 of FIG. 4 tows the source 103 from the end, or stern, 405 of the source vessel 106' rather than the side as described above. Those in the art having the benefit of this disclosure will be able to readily adapt the technique for use in embodiments employing a side tow rather than a stern tow.

The towing apparatus 500, shown in FIG. 5, generally comprises a winch 505, a heave compensator 510, and an overboarding sheave 515. The overboarding sheave 515 comprises a fixed sheave 520 from which a free sheave 525 is suspended by a cable 555. The winch 505 raises and lowers the source 103 from an umbilical 530 over the free sheave 525. Free movement of the free sheave 525 indicated by the arrow 535 is permitted by the suspension of the free sheave 525 from the fixed sheave 520. Free movement of the cable 555 as indicated by the arrow 540 is permitted by the heave compensator 510 in conventional fashion.

The arrangement described immediately above separates the suspension system 545 (i.e., the winch 505, fixed sheave 520, and free sheave 525 in this embodiment) from the heave compensation system 550 (i.e., the heave compensator 510 in this particular embodiment). The heave compensation is therefore "indirect" relative to conventional practice in which heave compensation is applied directly to the tow line. The separation permits, among other things, the motion of the free sheave 525 to be controlled by the heave compensation system 550 with a cable 555 that is thinner than the umbilical 530. In some embodiments, this separation also facilitates lifting the seismic source 103 out of the water on the tow line 530 without the need for an overshot tool. It also removes, in the illustrated embodiments, a mechanical termination associated with an electro-optical umbilical from the tow path and increases the towline robustness generally. Other advantages and benefits of this separation will become apparent to those skilled in the art having the benefit of this disclosure.

Still referring to FIG. 5, the umbilical 530 is encased in a VIV-suppression sheath 560. In the depicted embodiment, the sheath 560 comprises a fibrous material that dissipates energy and dampens vibrations in the umbilical 530 induced by the relative movement of the umbilical 530 and the water column 127, in particular caused by motion of the source vessel 106'. The fibrous material may be, for example, a loose spun fiber or a fringed fiber, or any other VIV-suppression system known to the art.

The combination of the sheath 560 and the umbilical 530 will be too thick to pass through the heave compensator of a conventional system. Note that one of the benefits of separating the suspension system 545 from the heave compensation system 550 is that the movement of the free sheave 525 can be controlled by the heave compensator 510 using a cable 555 thinner than the umbilical 530. The cable 555 is thin enough to pass through the heave compensation system. Thus, another benefit of such a separation is that it permits the use of the VIV-suppression sheath 560 with the umbilical 530.

In an alternative embodiment, not shown, the umbilical 530 is replaced by a tow line. The combination of tow line and VIV-suppression sheath 560 is also too thick to pass through the heave compensation system. The tow line supports the weight of the source 103, but unlike an umbilical does not carry energy or telemetry. A separate umbilical line (not shown) is deployed from the vessel to carry these. The umbilical does not normally carry the weight of the device and extra umbilical line can be deployed to ensure it will not be taut. The umbilical thus suffers much less from undesirable VIV, although in some embodiments VIV suppression will also be used on the non-taut umbilical line to stabilize its motion through the water. The umbilical should be buoyant (to avoid entanglement with the source 103) and in some embodiments may be strong enough to support the weight of the device so it can be used for deployment or recovery, and as an alternative backup support system in case of a breakdown of the suspension system 545 or the tow line 530.

The distinction between a side tow and a stern tow is otherwise largely an economic consideration. A side tow requires the use of a large, fixed crane. Vessels, for example dive support vessels and construction vessels, equipped with such cranes are known to the art and are commercially available. They are, however, quite expensive. The stern tow can be performed with an offshore supply vessel, which is less expensive than dive support vessels and construction vessels.

Returning to FIG. 1, in acquisition, the source(s) 103 impart one or more seismic signals 124 described above into the water column 127 to penetrate the seabed 112 where they interact with the subterranean formation 130. The modified seismic signals 133 then propagate back to the receiver array 136 disposed on the seabed 112 as described above. The modified seismic signals 133 are detected by the nodes 115 and recorded as seismic data. The recorded seismic data are then communicated to a computing facility 139. This communication may be, for example, by hard copy on a magnetic tape 142 or by transmission via a satellite 145.

The presently disclosed technique employs a low frequency source as described above and, in some embodiments, may employ other types of sources as well. In different frequency ranges, different types of sources (e.g., impulsive versus swept-frequency) may perform better. In circumstances where a swept-frequency device performs better, different types of sweeps (broadband or narrowband) may be optimal. Thus, there may be circumstances in which more than one type of source or mode of operation may be desirable.

Thus, in some embodiments, the low frequency source may be used in conjunction with an impulsive source—namely, airguns. The airguns are louder than a correlated sweep from the low frequency device, at least above about 4 Hz. For lower frequencies, the microseismic background noise floor steadily increases and becomes the dominant factor below about 2 Hz. At some point, then, the narrow-band humming acquisition becomes useful as discussed above. Some embodiments might even use a very narrow-bandwidth sweep (e.g., 1.7-1.8 Hz) instead of a monochromatic hum.

Embodiments using humming sources can also divide "humming" sweeps. For example, one device may hum continuously on a particular frequency while another device is "humming" at a different particular frequency. At higher frequencies that are not quite so constrained by the background noise, a single low frequency source may cover two or more frequencies by cycling between them, humming on one pitch, then another, in a cycle. If multiple low frequency sources are available, some embodiments may deploy them and acquire data from them simultaneously, taking precautions where the devices have overlapping frequencies.

However, humming acquisition does not need to use overlapping frequencies. The frequencies can therefore be separated by bandpass filtering. In that case the only overlap would be between the upper range of a sweeping low frequency source and the lower range of an airgun. The low frequency sources would almost certainly be deployed from different vessels than the airguns, due to their differing towing requirements. (The airguns would likely be towed from streamer vessels that were also towing streamers.) Even if they are not, the airguns and the low frequency sources should be separable by simultaneous-source techniques that take advantage of the very different source signatures between airguns and the low frequency sweeps. And, if the airgun survey is done at a different time, the separation is trivial.

Figure 6:
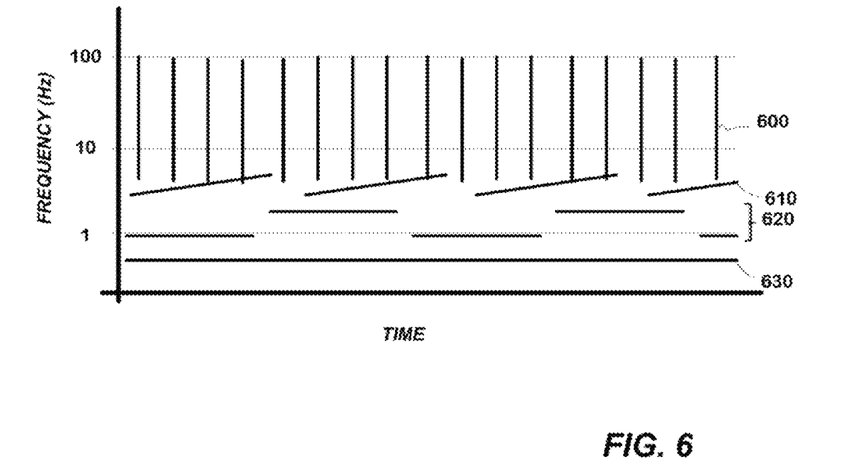
FIG. 6 illustrates a "simultaneous hum-sweep-bang" acquisition concept graphically.

FIG. 6 shows a spectrogram plot of this "simultaneous hum-sweep-bang" acquisition concept graphically. Note that the various different sources may be operated simultaneously or separated in time, in any combination. The plurality of broadband (~6-100 Hz) impulsive signals 600 indicate airguns firing. The sweeps (2-8 Hz) 610, bichromatic ("two-tone") hums (0.98 and 1.4 Hz) 620, and monochromatic hum (0.7 Hz) 630 are all generated by a low frequency source such as the one discussed above.

Monochromatic hums have the advantage of putting the maximal energy available from a seismic source into a particular frequency. If the data are divided into "shot points" during processing, complete freedom is maintained on how to do that: the inline shot interval becomes a processing parameter. However, they have the disadvantage that processing the resulting data may require modifications to a legacy processing workflow that assumes there are discrete, non-overlapping "shot points" and that sources do not move during a "shot".

Two-tone hums have the advantage that one source can effectively provide two interleaved shot lines in a single pass. They also have the advantage of fitting more easily into legacy FWI workflows designed for impulsive airgun data, but the two-tone hum must be designed properly to gain this advantage.

Consider a proposed two-tone hum at frequencies of 1.55 and 2 Hz, to be deployed from a source moving at 4 knots (=~2 m/s). Each frequency must repeat before the source has moved greater than the desired shot inline sample spacing for that frequency. The higher frequency requires a finer sample spacing than the lower frequency, hence the upper frequency 2 Hz is controlling. At 2 Hz the Nyquist sample spacing for waves moving at a water velocity of 1500 m/s is 375 meters. The source moves this distance in 375 m 2 m/s=187.5 seconds, which sets an upper time limit for the length of the complete two-tone hum.

If we wish to be able to approximate the source as stationary over the length of time of a single-frequency hum, it should travel no further than about the Nyquist sample spacing over 2, over this time interval. Thus for the upper frequency of 2 Hz, the maximum distance the source travels should be about 375 m 2=187.5 meters, a distance a source traveling at 4 knots travels in ~94 seconds. For the lower frequency of 1.55 Hz, the Nyquist sample spacing is ~484 meters, a distance a source traveling at 4 knots travels in ~242 seconds, and half this is ~121 seconds.

We typically desire the two frequencies to have approximately equal signal-to-noise ratios. If the signal-to-noise ratio declines at about 30 dB per octave, 2.0/1.55 is ~0.37 octaves, then the decline in signal-to-noise ratio from the higher to the lower frequency is about 30 times 0.37 or 11 dB. The source always operates at its maximum amplitude, so the only way to make up the 11 dB is to increase the length of time the signal is integrated over. Repeating cycles of the source sum coherently (linearly with integration time). The noise over a longer period of time also sums, but incoherently (as the square root of the integration time), so the signal-to-noise ratio increases as the square root of the integration time. 11 dB is an amplitude factor of ~3.56, and the square of this is ~12.7, implying the lower frequency should last for 12.7 times as long as the upper frequency to have equal signal-to-noise ratio.

In practice, unless the two frequencies are relatively close together this ratio is not achievable, because we also need to provide a sufficient time gap for the standing wave pattern in the Earth generated by the humming source at a particular frequency to decay away, so that signals from adjacent "shots" at that frequency don't overlap. This is about 20 to 40 seconds for the deep water Gulf of Mexico. So in practice we devote as much of the sweep as possible to the lower frequency, and then emit the upper frequency just long enough to fill the minimum time gap required between consecutive lower-frequency hums. In this case, the two-tone hum thus should consist of 121 seconds at 1.55 Hz followed by about 30 seconds at 2 Hz.

Another design choice is how quickly to sweep from one frequency to the next. Partly this will depend on physical constraints (how quickly is the device capable of changing frequency), but we may also choose to transition between frequencies more slowly than physically necessary, to gain some of the advantages of a narrowband sweep.

What matters is achieving the signal-to-noise ratio over the range of frequencies required to meet the geophysical goals, as determined by modeling. At best, the noise levels can only be estimated beforehand. Ambient noise at frequencies below about 2 Hz varies with the sea state, which depends on the weather. The weather cannot be accurately predicted very far ahead, and it may be desirable to account for this unknown variability during the survey design. So, for example, the survey design may produce a range of profiles of varying amplitudes, lengths, and tow speeds, with the choice of which profile(s) to use on a given day determined in the field depending on, for example, the sea state, measured or estimated noise levels, currents, and tow-depth control accuracy. This example only serves to illustrate the general design principles. Different choices of frequencies, estimates of the slope of the signal-to-noise ratio, desired minimum and maximum source vessel speeds, etc., will produce different results.

Returning to the "hum-sweep-bang" acquisition concept, in some embodiments, one or more low-frequency humming datasets and narrowband sweeping datasets are combined with a conventional broadband dataset for processing. The one or more low-frequency humming datasets, one or more narrowband sweeping datasets, and conventional broadband datasets may be acquired in any order. In particular, they may be acquired sequentially, or interleaved by shot lines, or interleaved within a shot line, or acquired simultaneously and separated using any of the standard techniques known in the art, or in any combination of these. One or more of the datasets may be "legacy" data, acquired previously for other purposes.

In some embodiments, the "conventional broadband" dataset may not use airguns as a source, but may instead use a different type of broadband source, for example a marine loudspeaker source that emits broadband pseudorandom noise. In other embodiments, the "conventional broadband" source may be sweeping sources that sweep over a sufficient range to become broadband, or consist of a mixture of sweeping sources that together are broadband. In this case the entire desired frequency range may be covered by just the humming and sweeping sources in FIG. 6.

In marine "hum-sweep-bang" or "hum-sweep" acquisition, the receivers may be ocean-bottom nodes or ocean-bottom cables, but may also be streamers, wave gliders, receivers in a borehole, etc. In some embodiments, different sources may be recorded into distinct receivers. For example, the impulsive broadband seismic signals might be recorded by conventional streamers (which may have sufficiently low noise at frequencies above ~6 Hz to be adequate for the purpose), but the humming and sweeping seismic signals by ocean-bottom nodes, or low-noise deep-tow streamers.

Although described in terms of marine acquisition, those of ordinary skill in the art will also readily appreciate that this "hum-sweep-bang" or "hum-sweep" acquisition concept could equally well apply to land acquisition, with land vibrators taking the role as the humming and sweeping sources, dynamite as the impulsive source, and geophones as the receivers.

In one particular embodiment, the low frequency seismic data acquired as described above is processed as disclosed in U.S. application Ser. No. 14/525,451, entitled, "Two Stage Velocity Model Generation", and filed Oct. 28, 2014, in the name of the inventors Andrew J. Brenders and Joseph A. Dellinger. As disclosed therein, the process is applicable to the development of models of all manner of subsurface attributes. Those skilled in the art having the benefit of this disclosure will appreciate how to modify the acquisition taught therein to incorporate the teachings disclosed herein and how to apply the disclosed processing technique to the resulting seismic data.

Another acquisition technique is taught in U.S. application Ser. No. 13/327,524, entitled, "Seismic Acquisition Using Narrowband Seismic Sources", filed Dec. 15, 2011, in the name of the inventors Joseph A. Dellinger et al., published Jun. 21, 2012, as U.S. Patent Publication 2012/0155217. Those skilled in the art having the benefit of this disclosure will also appreciate how to modify the acquisition taught therein to incorporate the teachings disclosed herein.

The following patent applications and patents are hereby incorporated by reference for those portions that are listed and for the purposes set forth as if set forth verbatim herein.

U.S. application Ser. No. 14/525,451, entitled, "Two Stage Velocity Model Generation", and filed Oct. 28, 2014, in the name of the inventors Andrew J. Brenders and Joseph A. Dellinger for its teachings regarding the processing disclosed in FIGS. 1 and 7 therein and the associated text, and more particularly ¶¶[0025]-[0064], and [0079]m[0111].

U.S. application Ser. No. 13/327,524, entitled, "Seismic Acquisition Using Narrowband Seismic Sources", filed Dec. 15, 2011, in the name of the inventors Joseph A. Dellinger et al., published Jun. 21, 2012, as U.S. Patent Publication 2012/0155217, and commonly assigned herewith for its teachings regarding data acquisition located at ¶¶[0024]-[0040] [0054]-[0059], [0065]-[0088] modified as taught herein.

U.S. Pat. No. 6,975,560, entitled, "Geophysical Method and Apparatus", and issued Dec. 13, 2005, to BP Corporation North America Inc., as assignee of the inventors Eivind W. Berg et al., for its teaching regarding the deployment of nodes from a carrier using an ROV and, in particular, the teachings at column 1, line 30 to column 2, line 9; column 2, line 21 to column 3, line 37; column 4, line 57 to column 5, line 16; column 5, line 27 to column 8, line 45, and the drawings referenced therein.

U.S. Pat. No. 8,387,744, entitled, "Marine Seismic Source", and issued Mar. 5, 2013, to BP Corporation North America Inc., as assignee of the inventors Mark Harper et al., for its teaching regarding the design and operation of a humming and narrowband seismic source at column 5, line 62 to col. 12, lines 46.

U.S. application Ser. No. 14/515,223, entitled, "System and Method for Resonator Frequency Control by Active Feedback", filed on Oct. 15, 2014, in the name of the inventors Mark Francis Lucien Harper; Joseph Anthony Dellinger.

U.S. Patent Application having priority to U.S. Provisional Application No. 62/086,362, entitled, "Box Wave Arrays in Marine Seismic Surveys", filed on an even date herewith in the name of the inventors Andrew J. Brenders, et al., and commonly assigned herewith.

To the extent that any patent, patent application or paper incorporated by reference herein conflicts with the present disclosure, the present disclosure controls.

In several places the description uses the modifier "approximately" or its mathematical equivalent symbol "~". This is a recognition that will be appreciated by those in the art that precise numbers can be difficult in this type of endeavor. For example, in towing the low frequency seismic sources, currents, temperatures, salinity, and other environmental conditions may fluctuate between deployment and retrieval making it difficult to achieve and maintain a desired numerical value for some operating parameters. Similarly, these types of parameters will vary amongst survey areas as will the numerical values for the various quantities. Those skilled in the art having the benefit of this disclosure will appreciate these kinds of variations and so appreciate the approximation and what it means rather than crisp numerical values.

Where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for use in seismic surveying, comprising:
   imparting a plurality of humming seismic signals into a geological formation;
   imparting a plurality of broadband seismic signals into the geological formation;
   imparting a plurality of swept seismic signals into the geological formation simultaneous with the imparting of the plurality of humming seismic signals and the imparting of the broadband seismic signals, wherein the plurality of humming seismic signals, the plurality of broadband seismic signals and the plurality of swept seismic signals are each imparted at different frequencies, and wherein a frequency range of the plurality of humming seismic signals and a frequency range of the plurality of swept seismic signals are selected to augment a frequency range of the broadband seismic signals; and
   receiving returned seismic energy of the plurality of humming seismic signals, the broadband seismic signals, and the plurality of swept seismic signals after interacting with the geological formation; and
   recording the returned seismic energy.

2. The method of claim 1, wherein imparting the humming seismic signals includes generating a monochromatic hum.

3. The method of claim 1, wherein imparting the humming seismic signals includes generating a bichromatic hum.

4. The method of claim 1, wherein a lower limit of the frequency range of the swept seismic signals is greater than an upper limit of the frequency range of the humming seismic signals.

5. The method of claim 1, wherein the broadband seismic signals are one of impulsive seismic signals or swept seismic signals.

6. The method of claim 1, wherein the broadband seismic signals are pseudorandom noise seismic signals.

7. The method of claim 1, wherein the frequency range of the broadband seismic signals is greater than the frequency range of the swept seismic signals.

8. The method of claim 1, wherein the survey is one of a marine seismic survey and a land seismic survey.

9. A system for seismic surveying, comprising:
a humming source configured to impart a plurality of humming seismic signals into a geological formation;
a broadband seismic source configured to impart a plurality of broadband seismic signals into the geological formation;
a swept source configured to impart a plurality of swept seismic signals into the geological formation simultaneous with the imparting of the plurality of humming seismic signals and the imparting of the broadband seismic signals, wherein the plurality of humming seismic signals, the plurality of broadband seismic signals, and the plurality of swept seismic signals are each imparted at different frequencies, and wherein a frequency range of the plurality of humming seismic signals and a frequency range of the plurality of sweet seismic signals are selected to augment a frequency range of the broadband seismic signals;
one or more receivers configured to receive returned seismic energy of the plurality of humming seismic signals, the broadband seismic signals, and the plurality of swept seismic signals after interacting with the geological formation; and
a recording device configured to record the returned seismic energy.

10. The system of claim 9, wherein the humming source is configured to generate a monochromatic hum.

11. The system of claim 9, wherein the humming source is configured to generate a bichromatic hum.

12. The system of claim 9, wherein a lower limit of the frequency range of the swept seismic signals is greater than a upper limit of the frequency range of the humming seismic signals.

13. The system of claim 9, wherein the broadband source comprises one of an impulsive seismic source and one or more swept seismic sources.

14. The system of claim 9, wherein the broadband seismic signals are pseudorandom noise seismic signals.

15. The system of claim 9, wherein the frequency range of the broadband seismic signals is greater than the frequency range of the swept seismic signals.

* * * * *